June 11, 1940.   E. H. LAMPKIN   2,204,103
ROD COUPLING
Filed July 8, 1938
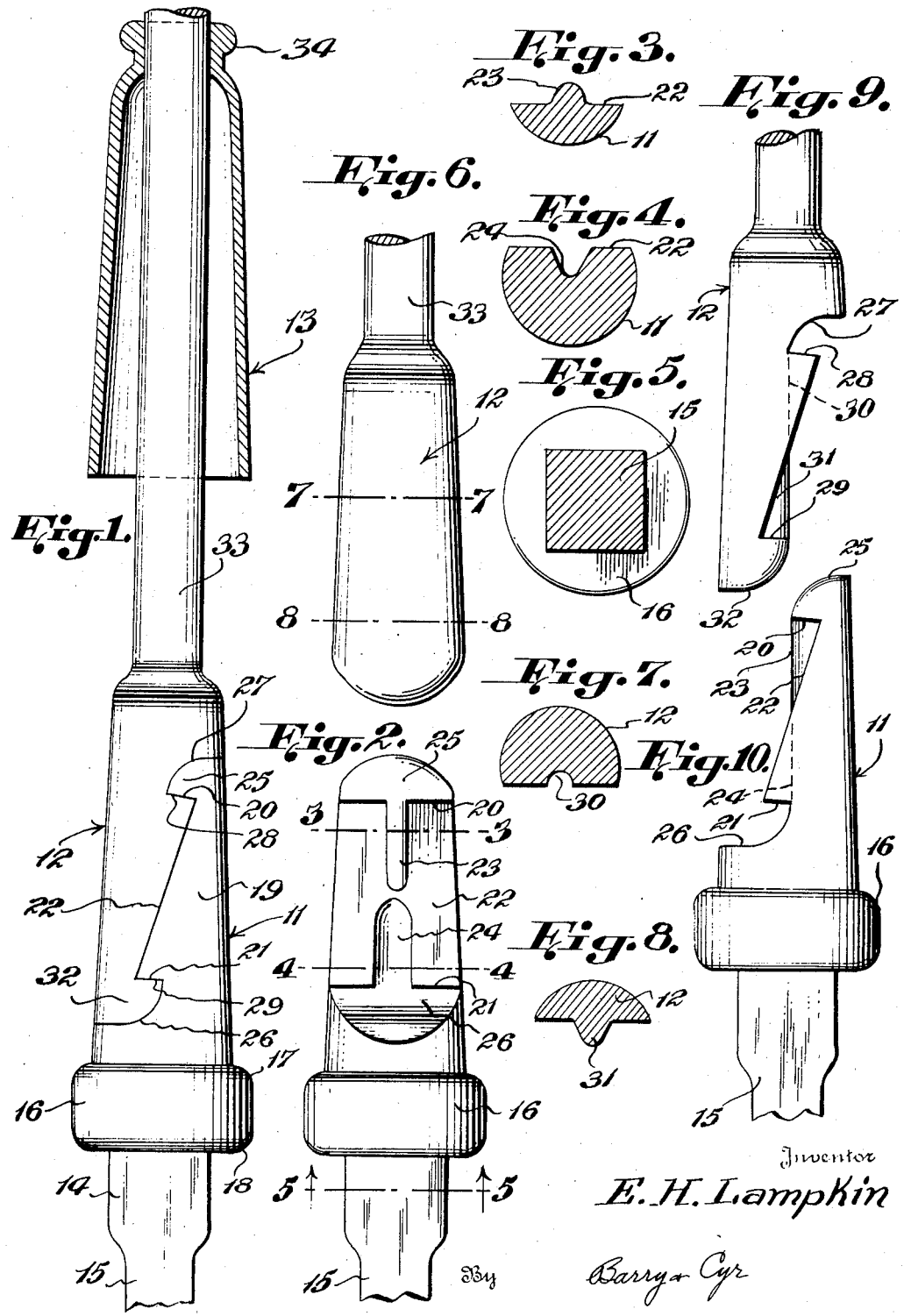
Inventor
E. H. Lampkin
By Barry & Cyr
Attorneys Patented June 11, 1940

2,204,103

UNITED STATES PATENT OFFICE 2,204,103

ROD COUPLING

Elbert H. Lampkin, Tulsa, Okla., assignor of one-fourth to George H. Dickinson, one-fourth to Wilfred Dickinson, and one-fourth to James T. Forster, all of Tulsa, Okla.

Application July 8, 1938, Serial No. 218,229

2 Claims. (Cl. 287—104)

This invention relates to improvements in rod couplings and more particularly to a novel threadless sucker rod coupling.

The primary object of the invention is to provide a rigid, simple, durable and trouble-free joint for use on sucker rods and the like, and which will take the place of the conventional threaded box and pin members for joining together sections of sucker rods.

Another object is to supply a coupling which may be assembled or dismantled without the use of wrenches or the like.

A further object is to provide a coupling which cannot accidentally break loose and which when used in an entire string of rods will enable the rod string to be unscrewed as one unit from the traveling valve at the bottom of the well should such valve become sanded up to such an extent that it could not be pulled from the working valve.

Another object is to supply a coupling of such design and construction as to permit, under operating conditions, tremendous pulling strength with minimum strain on the ferrule holding the parts together, thereby eliminating the costly wear on the conventional box and pin type of couplings.

A further object is to furnish a coupling having complementary members which are interlocked with one another in such manner as to efficiently transmit turning strains as well as vertical strains from one member to another.

With the foregoing objects outlined and with other objects in view which will appear as the description proceeds, the invention consists in the novel features hereinafter described in detail, illustrated in the accompanying drawing, and more particularly pointed out in the appended claims.

In the drawing:

Fig. 1 is a side elevation of my improved coupling with the ferrule in section and in raised position.

Fig. 2 is an elevation of the lower member of the coupling.

Figs. 3, 4 and 5 are horizontal sectional views taken respectively on the lines 3—3, 4—4 and 5—5 of Fig. 2.

Fig. 6 is an elevation of the upper member of the coupling viewed from the opposite side to the view in Fig. 2.

Figs. 7 and 8 are horizontal sectional views taken respectively on the lines 7—7 and 8—8 of Fig. 6.

Fig. 9 is a side elevation of the upper member of the coupling showing its profile.

Fig. 10 is a similar view of the lower member.

Referring to the drawing, my improved coupling consists of three units, the lower jaw member 11, upper jaw member 12 and ferrule 13, all designed to be drop-forged on the ends of any type sucker rod stock. The opposite ends of such stock may obviously be provided with conventional box and pin members, if desired, so that the joint may be incorporated in a rod string having one or more conventional box and pin joints.

The shank 15 of the lower member is provided with a square box 14 (Fig. 5) to receive any standard sucker rod elevator or rod wrench. Immediately above the square box, the lower member is provided with a clearance hub 16 chamfered at all edges as indicated at 17 and 18 to insure free passage in and out of standard tubing. The hub forms a bearing shoulder to rest the weight of the rods upon conventional elevators.

Immediately above the hub, the member 11 is provided with a tapered jaw 19 which is provided at its profile with substantially horizontal upper and lower shoulders 20 and 21 which merge into an inclined plane surface 22 which terminates at these shoulders.

The medial portion of such surface is intersected by an upper vertical tooth 23 and a lower vertical groove 24; the tooth 23 terminating at its upper end in the shoulder 20, and the groove 24 terminating at its lower end at the shoulder 21.

The upper end of the jaw terminates in a semi-dome 25 which is of the same shape as a cavity 26 that is provided in the jaw below the shoulder 21.

The upper jaw 12 is shaped complementary to the lower jaw so that the parts will interlock and form a frusto-conical structure. By way of explanation, the upper jaw has a cavity 27 to receive the dome 25; a shoulder 28 to engage the shoulder 20; a shoulder 29 to engage the shoulder 21; an upper vertical groove 30 to receive the tooth 23; a lower vertical tooth 31 to fit in the groove 24; and a semidome 32 at its lower end to fit in the cavity 26. When the two jaws are assembled as shown in Fig. 1, they are locked in position by the ferrule 13, which being slidably mounted on the shank 33 of the upper jaw, can be dropped downwardly to engage the outer surfaces of the jaws. To facilitate loosening of the ferrule when it is desired to detach the jaws from one another, the ferrule may be provided with any suitable means such as a projecting flange 34, which may be engaged by any suitable tool before the latter is struck by a hammer to move the ferrule upwardly.

It will be obvious from the foregoing that I have provided a trouble-free joint in any sucker rod string. Since there are no threads, no wrenches are necessary to make or break the connection. The operation required to set or disengage this coupling is so positive and yet so simple as to provide a major labor saving on any well pulling job. Rods coupled with such a joint cannot accidentally break loose, and an entire string of rods can be unscrewed as a unit from the traveling valve at the bottom of the well should the latter become stuck so that it could not be pulled from the working valve.

Under operating conditions, the design and construction of this coupling permit tremendous pulling strength with minimum strain on the ferrule.

This coupling when attached on short substitutes can be used to insert at every other joint on strings of threaded type rods so that the same can be removed at any time without disturbing the threaded joints.

Furthermore, the stabilizing teeth or ribs 23 and 31 have the advantage of strengthening the connection.

While I have disclosed what I now consider to be a preferred embodiment of the invention in such manner that the same may be readily understood by those skilled in the art, I am aware that changes may be made in the details disclosed, without departing from the spirit of the invention as expressed in the claims.

What I claim and desire to secure by Letters Patent is:

1. A rod coupling of the character described comprising upper and lower complementary jaw members having interlocked substantially horizontally disposed shoulders, one of said members having a rib and groove extending lengthwise thereof between its shoulders, the other member having a complementary rib and groove interlocked with the rib and groove of the first-mentioned member, said members forming a frusto-conical structure, a frusto-conical ferrule engaging said structure and clamping said members together, and cooperating means on the ferrule and upper member to prevent the ferrule from separating from the upper member.

2. A rod coupling of the character described, comprising complementary jaw members, each having a stepped abutment face, each abutment face including a recess forming a shoulder and a projection forming a second shoulder, each abutment face between its shoulders being in an inclined plane bisected by a vertically disposed rib and groove, the rib of each member being interlocked with the groove of the other member, and means clamping said members together.

ELBERT H. LAMPKIN.